United States Patent
Shankarappa

(10) Patent No.: US 8,601,118 B2
(45) Date of Patent: Dec. 3, 2013

(54) PRIORITIZING LAWFUL INTERCEPT SESSIONS

(75) Inventor: Divakar Shankarappa, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 180 days.

(21) Appl. No.: 13/158,974

(22) Filed: Jun. 13, 2011

(65) Prior Publication Data

US 2012/0317273 A1    Dec. 13, 2012

(51) Int. Cl.
*G06F 15/173*    (2006.01)

(52) U.S. Cl.
USPC .......................................... 709/224; 709/226

(58) Field of Classification Search
USPC ................................. 709/223–226
See application file for complete search history.

(56) References Cited

U.S. PATENT DOCUMENTS

| | | | |
|---|---|---|---|
| 7,480,239 B1 * | 1/2009 | Sundaresan et al. ........... | 370/230 |
| 7,643,442 B1 * | 1/2010 | Calhoun ......... | 370/328 |
| 2001/0046213 A1 * | 11/2001 | Sakoda ......... | 370/328 |
| 2003/0123388 A1 | 7/2003 | Bradd | |
| 2006/0002297 A1 | 1/2006 | Sand et al. | |
| 2006/0045095 A1 * | 3/2006 | Dhar et al. ............. | 370/395.42 |
| 2009/0034510 A1 * | 2/2009 | Smoyer et al. ............. | 370/352 |
| 2009/0254663 A1 * | 10/2009 | Alperovitch et al. ......... | 709/227 |
| 2009/0262697 A1 * | 10/2009 | To et al. ......... | 370/329 |
| 2010/0085978 A1 * | 4/2010 | Ramankutty et al. ......... | 370/401 |
| 2010/0086020 A1 * | 4/2010 | Schlack .......... | 375/240.01 |
| 2011/0013601 A1 * | 1/2011 | Cerasa et al. ............. | 370/336 |
| 2011/0044167 A1 * | 2/2011 | Kalonji et al. ............. | 370/230.1 |
| 2011/0122770 A1 * | 5/2011 | Iovieno et al. ............. | 370/235 |
| 2011/0149808 A1 * | 6/2011 | Yared ............. | 370/259 |
| 2012/0263036 A1 * | 10/2012 | Barclay et al. ............. | 370/230 |
| 2013/0191533 A1 * | 7/2013 | Sample ......... | 709/224 |

FOREIGN PATENT DOCUMENTS

| | | |
|---|---|---|
| EP | 1 976 204 A1 | 10/2008 |
| EP | 2 157 804 A1 | 2/2010 |
| WO | WO 2008/002895 A2 | 1/2008 |
| WO | WO 2008/105689 A1 | 9/2008 |

OTHER PUBLICATIONS

European Search Report corresponding to EP 11 19 3076 mailed Sep. 14, 2012, 7 pages.
European Telecommunications Standards Institute, "Universal Mobile Telecommunications System (UMTS); LTE; 3G Security; Lawful Interception Architecture and Functions (3GPP TS 33.107 version 9.1.0 Release 9)", Jul. 2010, 130 pages.

* cited by examiner

*Primary Examiner* — Joshua Joo
(74) *Attorney, Agent, or Firm* — Harrity & Harrity, LLP

(57) ABSTRACT

A method may include receiving a request for a lawful intercept (LI) session, where the LI session is associated with a particular priority of a set of priority levels, and determining whether a maximum quantity of LI sessions has been initiated by a network device. The method may further include initiating a new LI session based on the request, when the maximum quantity of LI sessions has not been initiated; determining whether at least one LI session exists that is associated with a lower priority than the particular priority, when the maximum quantity of LI sessions has been initiated; and terminating a particular LI session associated with a lowest priority and initiating a new LI session based on the received request, when the at least one LI session associated with the lower priority exists.

20 Claims, 8 Drawing Sheets

US 8,601,118 B2

PRIORITIZING LAWFUL INTERCEPT SESSIONS

BACKGROUND

Communication networks typically include network elements, which transfer or switch data from one or more sources to one or more destinations. For example, the network element may receive a data unit from a source device (or another network element), may determine a destination for the data unit, and may send an original or a modified data unit to a destination device (or another network element). A law enforcement agency may request to obtain packets, or information associated with the packets, sent or received by a particular target. Such activity may be identified as lawful interception. The law enforcement agency may send a request to a network element to obtain data associated with the target and the network element may set up a lawful intercept session associated with the target. The number of lawful intercept sessions that the network element is capable of handling may be limited, which may interfere with the operation of the law enforcement agency.

SUMMARY OF THE INVENTION

According to one aspect, a method performed by a network device, may include receiving, by the network device, a request for a lawful intercept (LI) session, where the LI session is associated with a particular priority of a set of priority levels; determining, by the network device, whether a maximum quantity of LI sessions has been initiated by the network device; initiating, by the network device, a new LI session based on the request, when the maximum quantity of LI sessions has not been initiated; determining, by the network device, whether at least one LI session exists that is associated with a lower priority than the particular priority, when the maximum quantity of LI sessions has been initiated; terminating, by the network device, a particular LI session associated with a lowest priority, when the at least one LI session associated with the lower priority exists; initiating, by the network device, a new LI session based on the received request, in response to terminating the particular LI session associated with the lower priority; and dropping, by the network device, the received request without initiating a new LI session, when the at least one LI session associated with the lower priority does not exist.

According to another aspect, a network device may include a memory to store LI session records associated with existing LI sessions of the network device; and a processor to: monitor packets based on the stored LI records; receive a request for an LI session, where the LI session is associated with a particular priority of a set of priority levels; determine whether a maximum quantity of LI sessions, of the stored LI session records, has been initiated by the network device; initiate a new LI session based on the request, when the maximum quantity of LI sessions has not been initiated; determine whether at least one LI session exists, in the stored LI session records, that is associated with a lower priority than the particular priority, when the maximum quantity of LI sessions has been initiated; terminate a particular LI session, in the stored LI session records, associated with a lowest priority, when the at least one LI session associated with the lower priority exists; initiate a new LI session based on the received request, in response to terminating the particular LI session associated with the lower priority; and drop the received request without initiating a new LI session, when the at least one LI session associated with the lower priority does not exist.

According to yet another aspect, a non-transitory computer-readable medium, storing instructions executable by one or more processors, may include one or more instructions to receive a request for an LI session, where the LI session is associated with a particular priority of a set of priority levels; one or more instructions to determine whether a maximum quantity of LI sessions has been initiated by the network device; one or more instructions to initiate a new LI session based on the request, when the maximum quantity of LI sessions has not been initiated; one or more instructions to determine whether at least one LI session exists that is associated with a lower priority than the particular priority, when the maximum quantity of LI sessions has been initiated; one or more instructions to terminate a particular LI session associated with a lowest priority, when the at least one LI session associated with the lower priority exists; one or more instructions to initiate a new LI session based on the received request, in response to terminating the particular LI session associated with the lower priority; and one or more instructions to drop the received request without initiating a new LI session, when the at least one LI session associated with the lower priority does not exist.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers may be used in different drawings to identify the same or similar elements.

An implementation described herein may relate to prioritizing lawful intercept (LI) sessions. A request for an LI session may include a priority associated with the LI session. For example, a Dynamic Tasking Control Protocol (DTCP) packet that includes the request may include a priority field that identifies a priority associated with the request. For example, a first target may be assigned a low priority, indicating that an existing LI session associated with the first target may be deleted if a maximum number of LI sessions is reached, while a second target may be assigned a high priority, indicating that an existing LI session associated with the second target should not be deleted when a maximum number of LI sessions is reached.

If a request for a new LI session is received by a network device and the maximum number of LI sessions that the network device is configured to handle has not been reached, the new LI session may be initiated regardless of the priority associated with the received request. If the maximum number of LI sessions has been reached, an existing LI session with a lower priority is selected and dropped before the new LI session is initiated. An existing LI session to be dropped is selected from a set of LI sessions associated with the lowest priority based on whether an LI session exists that is associated with an invalid target and based on whether an LI session exists that is in an idle state. If no LI sessions, from the set of LI sessions associated with the lowest priority, are associated with an invalid target or an idle state, then the oldest LI session from the set is selected to be dropped. If there are no existing LI sessions with a lower priority, the received request is dropped and a new LI session based on the received request is not initiated.

Figure 1:
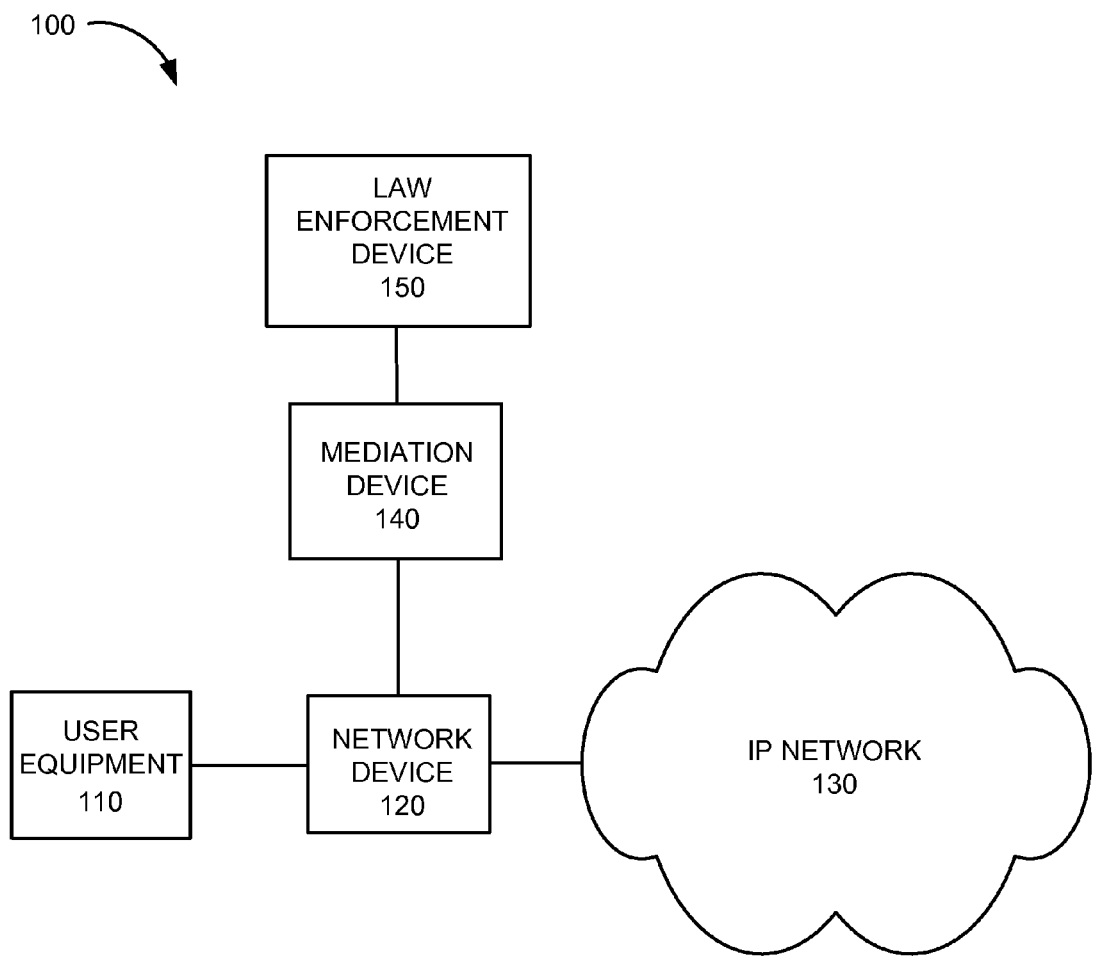
FIG. 1 is a diagram illustrating an example system according to an implementation described herein.

FIG. 1 is a diagram illustrating an example system 100 according to an implementation described herein. As shown in FIG. 1, system 100 may include user equipment (UE) 110, a network device 120, an Internet Protocol (IP) network 130, a mediation device 140, and a law enforcement device 150. While a single UE 110, a single network device 120, a single IP network 130, a single mediation device 140, and a single law enforcement device 150 are illustrated in FIG. 1 for simplicity, system 100 may include multiple UEs 110, multiple network devices 120, multiple IP networks 130, multiple mediation devices 140, and/or multiple law enforcement devices 150.

UE 110 may include any user device with a communication function, such as a portable communication device (e.g. a mobile phone, a smart phone, a tablet computer, a global positioning system (GPS) device, and/or another type of wireless device); a content recording device (e.g., a camera, a video camera, etc.); a gaming system; a personal computer or workstation; a server device; a portable computer; a voice over Internet Protocol (VoIP) telephone device; a radiotelephone; and/or any type of user device capable of communicating with IP network 130.

Network device 120 may include any device that receives and transmits packets within a network or between networks and that is enabled for lawful interception. Network device 120 may include, for example, a gateway, a router, a switch, a firewall, a network interface card (NIC), a hub, a bridge, a proxy server, an optical add-drop multiplexer (OADM), or some other type of device (e.g., a layer 2 and/or layer 3 device) that processes and/or transfers traffic. Network device 120 may include one or more ingress interfaces and one or more egress interfaces. Network device 120 may receive a packet at one of the ingress interfaces, determine a destination of the received packet, determine an egress interface based on the determined destination, and forward the packet via the determined egress interface.

IP network 130 may include one or more of a same type of packet-switched networks, or one or more packet-switched networks of different types. A "packet" may refer to a packet, a datagram, or a cell; a fragment of a packet, a fragment of a datagram, or a fragment of a cell; or another type, arrangement, or packaging of data. For example, IP network 130 may include one or more of a local area network (LAN), a wide area network (WAN), a metropolitan area network (MAN), an optical network, a cable television network, a satellite television network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of these networks or other types of networks.

In one example, system 100 may include an evolved packet system (EPS), as defined by the Third Generation Partnership Project (3GPP), which includes a Long Term Evolution (LTE) access network and an Evolved Packet Core (EPC) core network. In other words, network device 120 may perform the functions of an LTE or EPC node and IP network 130 may include an EPC network. For example, network device 120 may include Packet Data Network Gateway (PGW). Additionally or alternatively, network device 120 may include another LTE node, such as a Serving Gateway (SGW), a Mobility Management Entity (MME) device, and/or a Policy and Charging Rules Function (PCRF) device.

In another example, network device 120 may be part of another type of access network. For example, network device 120 may be part of a Global System for Mobile Communication (GSM) network, where network device 120 corresponds to a General Packet Radio Service (GPRS) node, such as a Serving GPRS support node (SGSN) and/or a Gateway GPRS Support Node (GGSN). As another example, network device 120 may be part of a code division multiple access (CDMA) network, where network device 120 corresponds to a packet data service node (PDSN)

In yet another example, network device 120 may not necessarily function as a link between UE 110 and IP network 130. Instead, UE 110 may connect to network device 120 via IP network 130 (not shown in FIG. 1). For instance, IP network 130 may include an IP Multi-media System (IMS) network and network device 120 may correspond to an IMS node, such as a Proxy Call Session Control Function (P-CSCF) or a Serving Call Session Control Function (C-CSCF). As a further example, network device 120 may correspond to a device that performs authentication and/or authorization, such as an Authentication, Authorization, and Accounting (AAA) server device, a Remote Authentication Dial In User Service (RADIUS) server device, a Diameter server device, a home agent (HA) device, a Home Location Register (HLR) device, and/or a Home Subscriber Server (HSS) device. As a still further example, network device 120 may correspond to a Short Message Service (SMS) server.

Mediation device 140 may include one or more devices that send a request to initiate an LI session to network device 120. Mediation device 140 may also receive information associated with the LI session from network device 120. In one example, mediation device 140 may be implemented as part of network device 120. In another example, mediation device 140 may be implemented in a device separate from, and possibly remote from, network device 120.

In one example, law enforcement device 150 may include one or more devices associated with a law enforcement agency, or associated with another entity authorized to monitor packets moving through network device 120 (such as, for example, an administrator of network device 120). For example, an operator associated with the law enforcement agency may request a tap be placed on a particular phone number. The operator may generate a request for the tap using law enforcement device 150 and law enforcement device 150 may send the request for the tap to mediation device 140. Mediation device 140 may generate a request for an LI session based on target information associated with the particular phone number. In another example, law enforcement device 150 may be replaced with a person. In other words, a person may directly request a tap using mediation device 140.

Each law enforcement device 150 may be associated with a different mediation device 140 and the different mediation devices 140 may not be aware of each other. Thus, network device 120 may independently maintain LI sessions for different law enforcement agencies without one law enforcement agency becoming aware of LI sessions associated with another law enforcement agency (e.g., a local police department and a federal agency).

Although FIG. 1 shows example components of system 100, in other implementations, system 100 may include fewer components, different components, differently arranged components, and/or additional components than depicted in FIG. 1. Additionally or alternatively, one or more components of system 100 may perform one or more tasks described as being performed by one or more other components of system 100. For example, while FIG. 1 illustrates mediation device 140 and network device 120 as separate devices, in another example, part or all of the functionality of mediation device 140 may be implemented within network device 120.

Figure 2:
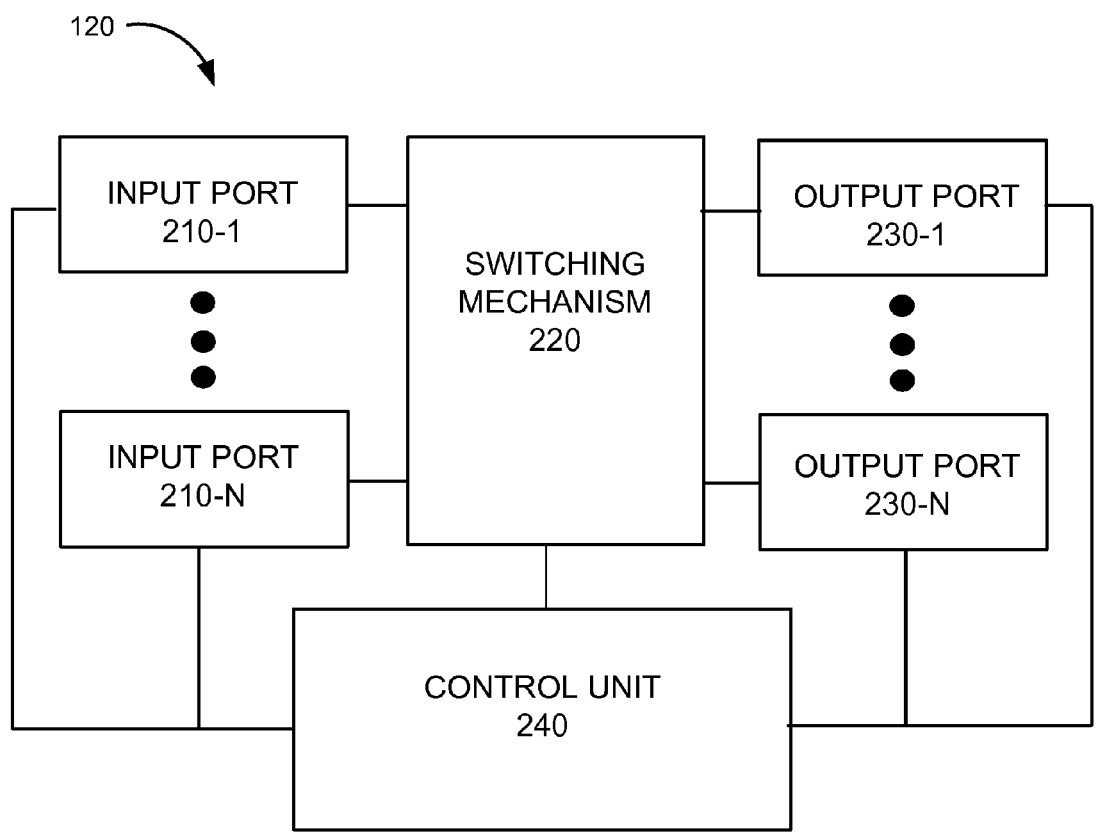
FIG. 2 is a diagram illustrating example components of a network device of the system of FIG. 1.

FIG. 2 is a diagram illustrating example components of network device 120 of the system of FIG. 1. As shown in FIG. 2, network device 110 may include one or more input ports 210-1 to 210-N (referred to herein individually as "input port 210" and collectively as "input ports 210"), a switching mechanism 220, one or more output ports 230-1 to 230-N (referred to herein individually as "output port 230" and collectively as "output ports 230"), and/or a control unit 240.

Input ports 210 may be the points of attachments for physical links and may be the points of entry for incoming traffic. An input port 210 may be associated with an interface card (not shown in FIG. 2). Switching mechanism 220 may include one or more switching planes to facilitate communication between input ports 210 and output ports 230. In one implementation, each of the switching planes may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card (not shown in FIG. 2). Control unit 240 may interconnect with input ports 210, switching mechanism 220, and/or output ports 230 and may control operation of network device 120. For example, if network element corresponds to a router, control unit 240 may perform control plane operations associated with network device 120 (e.g., control unit 240 may use routing protocols and may create a forwarding table that is used in traffic forwarding).

Although FIG. 2 shows example components of network device 120, in other implementations, network device 120 may include fewer components, different components, differently arranged components, and/or additional components than depicted in FIG. 2. Additionally or alternatively, one or more components of network device 120 may perform one or more tasks described as being performed by one or more other components of network device 120.

Figure 3:
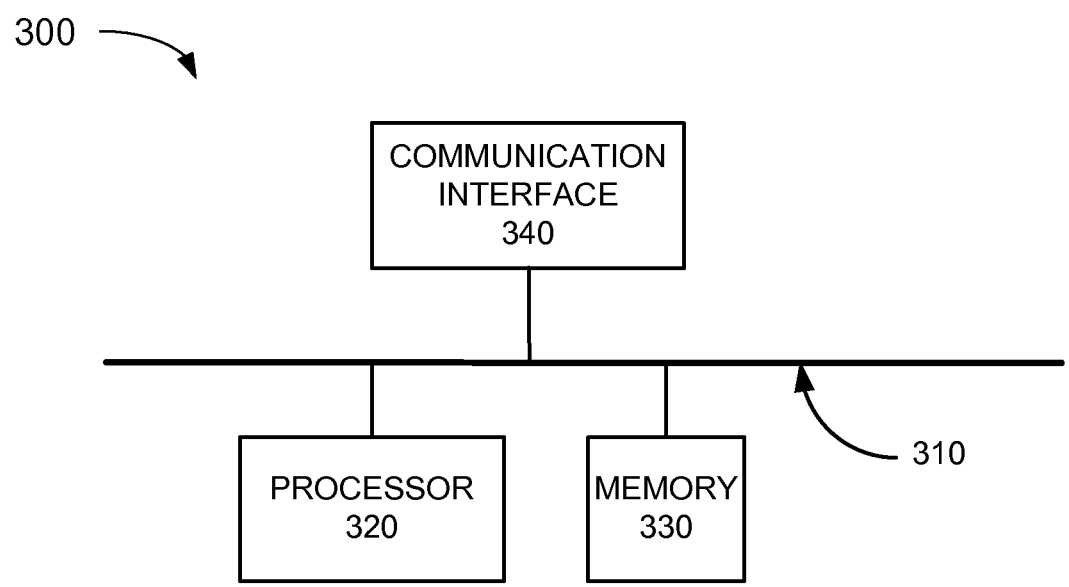
FIG. 3 is a diagram illustrating example components of a device that corresponds to one of the components of FIG. 2.

FIG. 3 is a diagram illustrating example components of a device 300 according to a first implementation described herein. In one implementation, device 300 may correspond to one or more of the components of network device 120, such as input port 210, switching mechanism 220, output port 230, and/or control unit 240. For example, each of input port 210, switching mechanism 220, output port 230, and/or control unit 240 may include one or more devices 300. In another implementation, device 300 may correspond only to control unit 240. As shown in FIG. 3, device 300 may include a bus 310, a processor 320, a memory 330, and a communication interface 340.

Bus 310 may include a path that permits communication among the components of device 300. Processor 320 may include one or more processors, microprocessors, or processing logic (e.g., application specific integrated circuits (ASICs), field programmable gate arrays (FPGAs), etc.) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Communication interface 340 may include any transceiver-like mechanism that enables device 300 to communicate with other devices and/or systems. For example, communication interface 340 may include a modem, a network interface card, and/or a wireless interface card.

As will be described in detail below, device 300 may perform certain operations. Device 300 may perform these operations in response to processor 320 executing software instructions contained in a computer-readable medium, such as memory 330. A computer-readable medium may be defined as a non-transitory memory device. A memory device may include memory space within a single physical memory device or spread across multiple physical memory devices.

The software instructions may be read into memory 330 from another computer-readable medium, or from another device via communication interface 340. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, additional components, or differently arranged components than depicted in FIG. 3. Additionally or alternatively, one or more components of device 300 may perform one or more tasks described as being performed by one or more other components of device 300.

Figure 4:
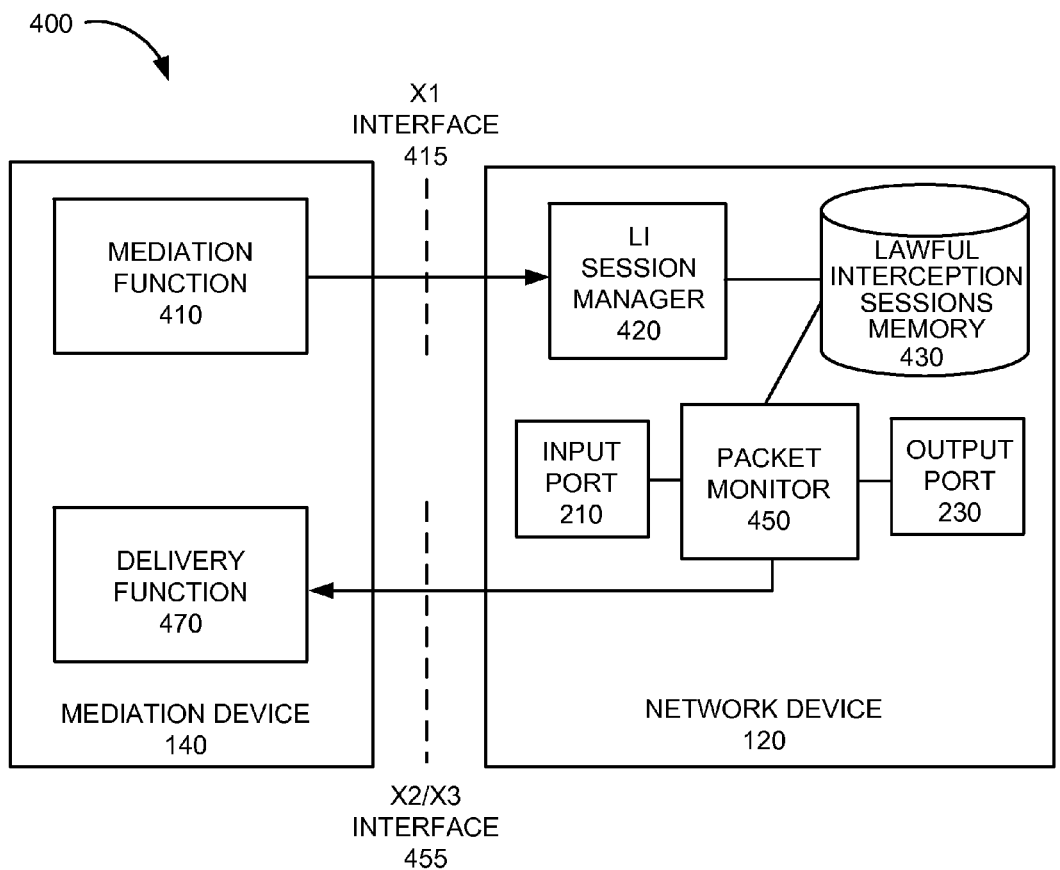
FIG. 4 is a diagram illustrating example functional components of a mediation device and a network device.

FIG. 4 is a diagram 400 illustrating example functional components of network device 120 and mediation device 140. As shown in FIG. 4, mediation device 140 may include a mediation function 410 and a delivery function 470 and network device 120 may include an LI session manager 420, an LI sessions memory 430, and a packet monitor 450.

Mediation function 410 may send a request to initiate an LI session associated with a particular target to LI session manager 420. Components of an example request are described below with respect to FIG. 5. In one example, if network device 120 includes an LTE node, such as a PGW, mediation function 410 may send the request over an X1 interface 415 using a DTCP packet. In another example, mediation function 410 may send the request using a different protocol (not shown in FIG. 4). Mediation function 410 may change a priority level associated with an existing LI session by sending a request to change the priority level to LI session manager 420.

LI session manager 420 may initiate, maintain, and terminate LI sessions on network device 120 based on priority levels associated with particular LI sessions. For example, LI session manager 420 may receive a request for an LI session from mediation device 410, where the LI session is associated with a particular priority level, and may determine whether to initiate an LI session based on the request. LI session manager 420 may monitor a number of currently active LI sessions and may determine whether the number of currently active LI sessions corresponds to a maximum number of LI sessions. If the maximum number of LI sessions has been reached, LI session manager 420 may determine if there is at least one existing LI session with a lower priority. If no LI session with a lower priority exists, LI session manager 420 may not initiate a new LI session based on the received request. If at least one LI session with a lower priority does exist, LI session manager 420 may select an existing LI session with a lower priority, may terminate the selected LI session, may inform mediation device 140 associated with the selected LI session that the selected LI session has been terminated, and may initiate a new LI session based on the received request. When selecting an existing LI session to terminate, LI session manager 420 may select an existing LI session associated with an invalid target, associated with a longest idle time, and/or associated with an oldest session initiation timestamp. LI session manager 420 may also change a priority level associated with an existing LI session if so requested by mediation function 410.

LI sessions memory 430 may store information about particular LI sessions. Example information that may be stored in LI sessions memory 430 is described below with reference to FIG. 6.

Packet monitor 450 may monitor packets received by network device 120. For example, a packet may be received by input port 210. Before the packet is forwarded to output port 230, packet monitor 450 may determine whether the packet is associated with a target that is associated with an existing LI session by accessing LI sessions memory 430. If the packet is associated with an existing LI session, packet monitor 450 may duplicate the packet and forward the duplicated packet, or forward information associated with the packet, to a destination specified by information associated with the existing LI session and stored in LI sessions memory 430. For example, packet monitor 450 may send the packet, or the information associated with the packet, to delivery function 470.

Delivery function 470 may receive the packet, or the information associated with the packet, and may process the received packet, or the information associated with the packet, based on specifications associated with law enforcement device 150. In one example, if network device 120 includes an LTE node, such as a PGW, delivery function 470 may receive the packet, or the information associated with the packet, over an X2/X3 interface 455 using a DTCP packet. In another example, delivery function 470 may send the request using a different protocol (not shown in FIG. 4).

In one example, mediation function 410 and delivery function 470 may be implemented in a same device (e.g., mediation device 140). In another example, mediation function 410 and delivery function 470 may be implemented by different, and possibly remote, devices. For example, mediation function 410 may instruct packet monitor 450 to deliver information, associated with a particular LI session, to a network address associated with a device that is different from mediation device 140.

Although FIG. 4 shows example functional components of network device 120 and mediation device 140, in other implementations, network device 120 and/or mediation device 140 may include fewer functional components, different functional components, differently arranged functional components, and/or additional functional components than depicted in FIG. 4. Additionally or alternatively, one or more functional components of network device 120 and/or mediation device 140 may perform one or more tasks described as being performed by one or more other functional components of network device 120 and/or mediation device 140.

Figure 5:
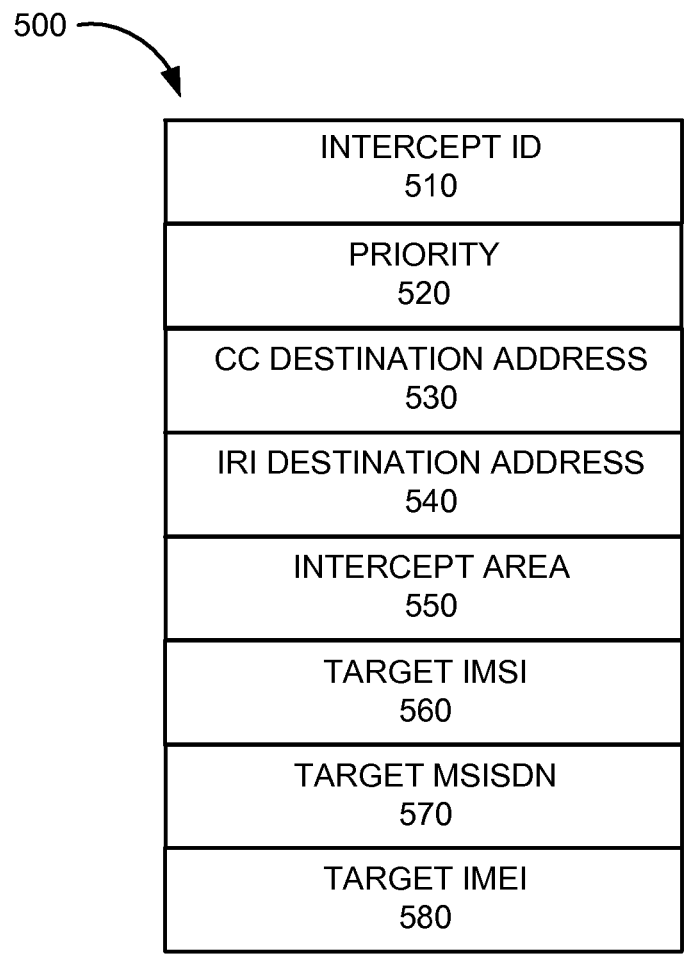
FIG. 5 is a diagram illustrating example fields of a packet that requests a lawful intercept session.

FIG. 5 is a diagram illustrating example fields associated with a request 500 for an LI session. Request 500 may be sent by mediation function 410 to network device 120. In one example, request 500 may correspond to a DTCP packet sent via an X1 interface. In another example, request 500 may be sent via another protocol and/or another interface. As shown in FIG. 5, request 500 may include an intercept identification (ID) field 510, a priority field 520, a Content of Communication (CC) destination address field 530, an Intercept Related Information (IRI) destination address field 540, an intercept area field 550, a target International Mobile Subscriber Identity (IMSI) field 560, a target Mobile Subscriber Integrated Services Digital Network number (MSISDN) field 570, and a target International Mobile Equipment Identity (IMEI) field 580.

Intercept ID field 510 may include a string that uniquely identifies a particular request for an LI session. Additionally or alternatively, intercept ID field may store warrant reference information associated with the particular request. Priority field 520 may include a priority level associated with the particular LI session. In one example, priority field 520 may include a priority bit that is set to a value of '0' for a low priority LI session or that is set to a value of '1' for a high priority LI session. In another example, priority field 520 may store a priority level value selected from a different set of priority values (e.g., from a set including a first value corresponding to a low priority, a second value corresponding to a medium priority, and a third value corresponding to a high priority).

CC destination address field 530 may store a network address and/or port number where CC information associated with the LI session is to be delivered. CC information may include the stream of data included with packets associated with the call. IRI destination address field 540 may store a network address and/or port number where IRI information associated with the LI session is to be delivered. IRI information may include information related to interception of a communication, such as, in the case of a voice telephone call, a source of an incoming call to the target, a destination of an outgoing call to the target, a time of the call, a duration of the call, etc.

Intercept area 550 may include information specifying a particular intercept area associated with the request. For example, the intercept area may specify that the LI session is to be limited to packets originating from or destined for a particular geographic area.

Target IMSI field 560 may store an IMSI associated with the target. An IMSI may uniquely identify a user by way of a Subscriber Identity Module (SIM) card installed in UE 110. Target MSISDN field 570 may store an MSISDN associated with the particular target. An MSISDN may uniquely identify a phone number that may be used to reach a user of UE 110.

Target IMEI field 580 may store an IMEI associated with the particular target. An IMEI may uniquely identify a particular UE 110.

Although FIG. 5 shows example fields of request 500, in other implementations, request 500 may contain fewer fields, different fields, additional fields, or differently arranged fields than depicted in FIG. 5. For example, while FIG. 5 depicts the request as specifying a target based on one or more of an IMSI, an MSISDN, or an IMEI, in another example, the target may be specified using other identification information (e.g., an IP address, a particular packet pattern, etc.).

Figure 6:
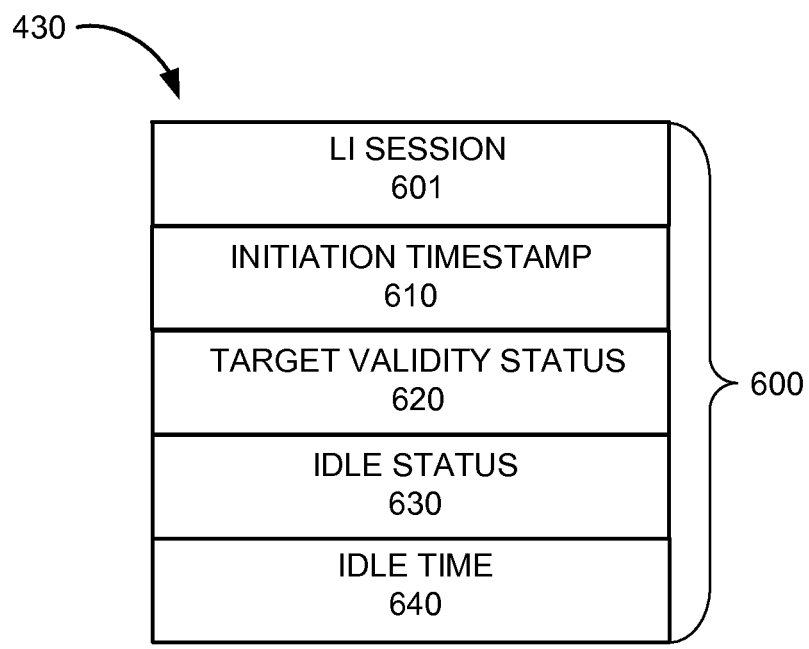
FIG. 6 is a diagram illustrating an example lawful intercept session record.

FIG. 6 is a diagram illustrating an LI session record 600 that may be stored in LI sessions memory 430. As shown in FIG. 6, LI session record 600 may include an LI session field 601, an initiation timestamp field 610, a target validity status field 620, an idle status field 630, and an idle time field 640.

LI session field 601 may include information identifying a particular LI session. For example, LI session field 601 may include information received in request 500, including intercept ID information and/or target information.

Initiation timestamp field 610 may store a timestamp associated with a time when the particular LI session was initiated. For example, when LI session manager 420 initiates a new LI session and generates a new LI session record 600, LI session manager 420 may generate a timestamp and store the timestamp in initiation timestamp field 610.

Target validity status field 620 may include information identifying whether a target specified in LI session field 601 is a valid target. A target may be assumed to be valid unless information received to the contrary is obtained. A target may become invalid if the target may no longer be identified. For example, a user of UE 110 may change phone numbers, and if the target is identified solely by an MSISDN, the MSISDN may no longer be valid. As another example, if the target is identified solely by an IMEI and UE 110 associated with the IMEI is destroyed, the IMEI may no longer be valid.

Idle status field 630 may include information indicating whether the particular LI session is idle. The particular LI session may be idle if no packets were sent or received by UE 110 for a particular length of time. Idle time field 640 may include information indicating how long UE 110 has been idle.

Although FIG. 6 shows example fields of LI session record 600, in other implementations, LI session record 600 may contain fewer fields, different fields, additional fields, or differently arranged fields than depicted in FIG. 6.

Figure 7:
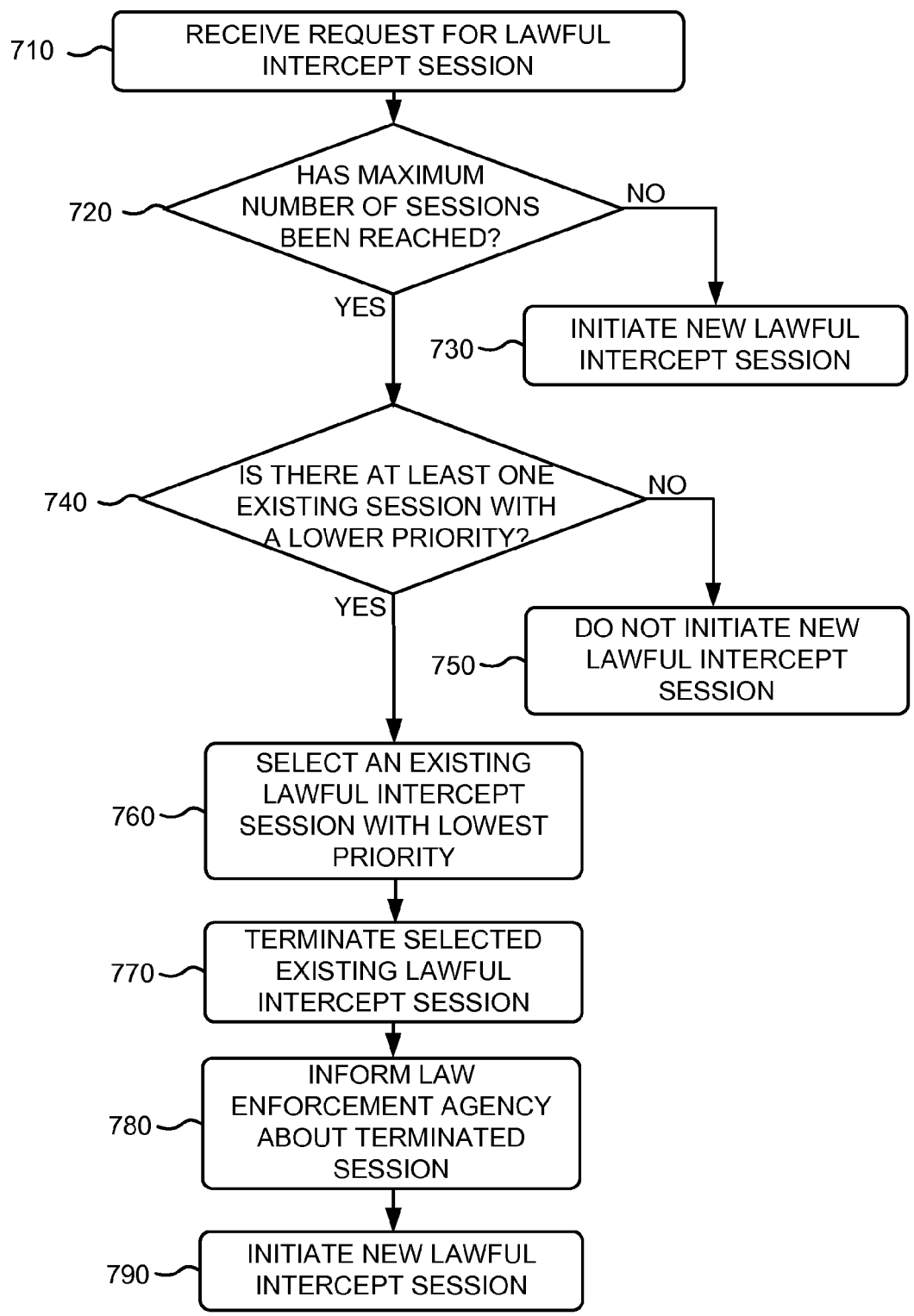
FIG. 7 is a diagram of a flow chart illustrating an example process for processing a request for a lawful intercept session according to an implementation described herein.

FIG. 7 is a diagram of a flow chart illustrating an example process for processing a request for an LI session according to an implementation described herein. In one implementation, the process of FIG. 7 may be performed by network device 120. In other implementations, some or all of the process of FIG. 7 may be performed by another device or a group of devices separate and/or possibly remote from or including network device 120.

The process of FIG. 7 may include receiving a request for an LI session (block 710). For example, LI session manager 420 may receive request 500 from mediation function 410. Request 500 may include information identifying a particular priority for request 500. A determination may be made as to whether a maximum number of LI sessions has been reached (block 720). Network device 120 may be able to handle a maximum number of LI sessions. For example, if network device 120 corresponds to a PGW node in an LTE system, network device 120 may be able to handle a maximum of 20,000 LI sessions. In another example, network device 120 may be able to handle a different number of LI sessions.

If it is determined that the maximum number of LI sessions has not been reached (block 720—NO), an LI session may be initiated based on received request 500 (block 730). When the maximum number of LI sessions has not been reached, LI session manager 420 may initiate a session based request 500 regardless of the priority associated with request 500. LI session manager 420 may generate a new LI session record 600 in LI sessions memory 430. LI session manager 420 may store information received in request 500 in LI session field 601 of the generated LI session record 600. Furthermore, LI session manager 420 may store a timestamp based on a current time in initiation timestamp field 610. Additionally, LI session manager 420 may check the validity of the target information included in request 500 and may set the target validity status in target validity status field 620 as valid, unless information to the contrary is obtained. Once LI session record 600 is generated based on the request, packet monitor 450 may monitor packets to determine whether the packets are associated with the target specified by request 500. For example, packet monitor 450 may monitor packets to see if the packets are associated with an IMSI, MSISDN, and/or IMEI specified by received request 500.

Returning to block 720, if it is determined that the maximum number of LI sessions has been reached (block 720—YES), a determination may be made as to whether there is at least one existing LI session with a lower priority (block 740). If the maximum number of LI sessions has been reached, LI session manager 420 may not be able to automatically initiate a new LI session based on received request 500. Rather, LI session manager 420 may need to take priorities associated with existing LI sessions, and a priority associated with the received request, into account.

LI session manager 420 may determine a priority level associated with received request 500 based on priority field 520 of received request 500 and may access LI session records 600 stored in LI sessions memory 430 to determine whether at least one LI session exists with a lower priority than the priority of received request 500.

If it is determined that there is not at least one existing LI session with a lower priority (block 740—NO), a new LI session may not be initiated based on the received request (block 750). For example, LI session manager 420 may drop (i.e., ignore) the received request 500 and no new LI session may be initiated based on received request 500. If it is determined that there is at least one existing LI session with a lower priority (block 740—YES), processing may proceed toward initiating a new LI session by proceeding to block 760.

Assume an example with two priority levels: a high priority (e.g., a priority bit set to '1') and a low priority (e.g., a priority bit set to '0'). In this example, if received request 500 includes a low priority setting, then no existing LI session will be of a lower priority and no new LI session may be initiated based on the received request. If received request 500 includes a high priority setting, if all existing LI sessions are high priority sessions, no existing LI session will be of a lower priority and no new LI session may be initiated based on the received request. However, if received request 500 includes a high priority setting and at least one existing LI session is a low priority session, a new LI session may be initiated based on the received request by replacing an existing LI session of a lower priority.

Assume an example with three priority levels: a high priority, a medium priority, and a low priority. In this example, if received request 500 includes a low priority setting, then no existing LI session will be of a lower priority and no new LI session may be initiated based on the received request. If received request 500 includes a medium priority setting, if all existing LI sessions are medium priority sessions or high priority sessions, no existing LI session will be of a lower priority and no new LI session may be initiated based on the received request. However, if received request 500 includes a medium priority setting and at least one existing LI session is a low priority session, a new LI session may be initiated based on the received request by replacing an existing LI session of a lower priority. If received request 500 includes a high priority setting, if all existing LI sessions are high priority sessions, no existing LI session will be of a lower priority and no new LI session may be initiated based on the received request. However, if received request 500 includes a high priority setting and at least one existing LI session is a medium priority session or a low priority session, a new LI session may be initiated based on the received request by replacing an existing LI session of a lower priority.

Continuing with FIG. 7 at block 760, if there is at least one existing LI session with a lower priority, an existing LI session with a lowest priority may be selected (block 760). For example, LI session manager 420 may select an existing LI session from a set of LI sessions of the lowest priority. A process for selecting an existing LI session is described below with reference to FIG. 8.

The selected existing LI session may be terminated (block 770). In one example, LI session manager 420 may remove the existing LI session from LI sessions memory 430 and packet monitor 450 may cease to monitor for packets associated with a target identified by the terminated LI session. In another example, LI session record 600 may include an active flag (not shown in FIG. 6) and LI session manager 420 may set the active flag to false, whereby packet monitor 450 may cease to monitor for packets associated with the target identified by the terminated session. In this example, the terminated session may remain in LI sessions memory 430 without being active and may be reactivated at a later time if the number of existing LI sessions drops below the maximum (e.g., in response to mediation function 410 terminating another session).

A law enforcement agency may be informed about the terminated LI session (block 780). For example, mediation device 140, associated with the terminated LI session, may be informed by LI session manager 420 that the selected existing LI session has been terminated.

A new LI session may be initiated (block 790). For example, LI session manager 420 may create a new LI session record 600 in LI sessions memory 430. LI session manager 420 may store information received in request 500 in LI session field 601 of the generated LI session 600. Once LI session record 600 is generated based on the request, packet monitor 450 may monitor packets to determine whether the packets are associated with the target specified by request 500. For example, packet monitor 450 may monitor packets to see if the packets are associated with an IMSI, an MSISDN, and/or an IMEI specified by received request 500.

Figure 8:
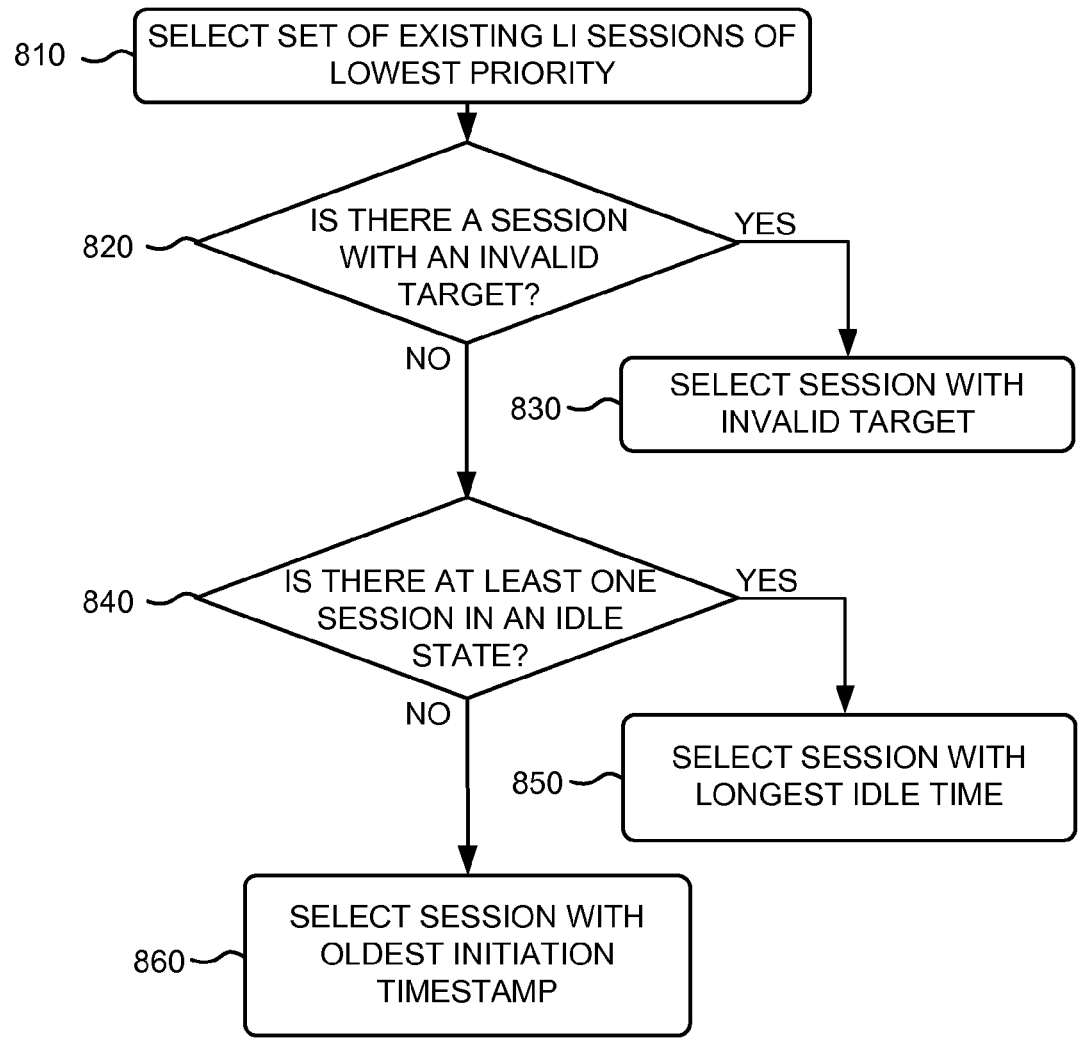
FIG. 8 is a diagram of a flow chart illustrating an example process for selecting an existing lawful intercept session to drop according to an implementation described herein.

FIG. 8 is a diagram of a flow chart illustrating an example process for selecting an existing lawful intercept session to drop according to an implementation described herein. In one implementation, the process of FIG. 8 may be performed by network device 120. In other implementations, some or all of the process of FIG. 8 may be performed by another device or a group of devices separate and/or possibly remote from or including network device 120.

The process of FIG. 8 may include selecting a set of existing LI sessions of lowest priority (block 810). For example, in an example with two priority settings (e.g., a low priority and a high priority), LI session manager 420 may select a set of all low priority LI sessions. As another example, in an example with three priority settings (e.g., a low priority, a medium priority, and a high priority), LI session manager 420 may select a set of all low priority LI sessions if at least one low priority LI session exists, and may select a set of all medium priority LI sessions if no low priority LI sessions exist.

A determination may be made as to whether there is a session with an invalid target (block 820). For example, LI session manager 420 may check target validity status field 620, of LI session records 600 of the selected set of LI sessions, to identify any existing LI sessions associated with an invalid target. As stated above, a target may become invalid if the target may no longer be identified. For example, a user of UE 110 may change phone numbers, and if the target is identified solely by an MSISDN, the MSISDN may no longer be valid. As another example, if the target is identified solely by an IMEI and UE 110 associated with the IMEI is destroyed, the IMEI may no longer be valid. It may be beneficial to terminate an LI session associated with an invalid target, as packet monitor 450 may not be able to identify packets associated with the invalid target and thus no useful information about the target may be obtained.

If it is determined that there is an existing LI session from the selected set that is associated with an invalid target (block 820—YES), the existing LI session associated with the invalid target may be selected (block 830). For example, LI session manager 420 may select the existing LI session with the invalid target and may terminate the selected LI session.

If it is determined that there is not an existing LI session in the selected set associated with an invalid target (block 820—NO), a determination may be made as to whether there is at least one existing LI session in an idle state (block 840). For example, LI session manager 420 may check idle status field 630, of LI session records 600 of the selected set of LI sessions, to identify any existing LI sessions in an idle state. An LI session may be designated as being in an idle state if there have been no packets detected for the target of the LI session for a particular length of time. It may be beneficial to select an existing LI session in an idle state, since no information is being obtained about the target while the LI session is in an idle state.

If it is determined that there is at least one LI session in an idle state (block 840—YES), an existing LI session with the longest idle time may be selected (block 850). For example, LI session manager 420 may select an existing LI session, from the selected set of LI sessions, with the longest idle time by checking idle time fields 640 of LI session records 600 of the selected set of LI sessions. LI session manager 420 may terminate the selected LI session associated with the longest idle time.

If it is determined that there is not at least one LI session in an idle state (block 840—NO), an existing LI session with the oldest initiation timestamp may be selected (block 850). For example, LI session manager 420 may select an existing LI session, from the selected set of LI sessions, with the oldest initiation timestamp by checking initiation timestamp fields 610 of LI session records 600 of the selected set of LI sessions. LI session manager 420 may terminate the selected LI session associated with the oldest initiation timestamp. A benefit of selecting an existing LI session with the oldest initiation timestamp may be that an older LI session may be less relevant to the activities of a law enforcement agency than a newer LI session.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with respect to FIGS. 7 and 8, the order of the blocks may be modified in other implementations. Further, non-dependent blocks may be performed in parallel.

Also, certain portions of the implementations may have been described as a "component," "function," "manager," "monitor," or "node" that performs one or more functions. The "component," "function," "manager," "monitor," and "node" may include hardware, such as a processor, an ASIC, or a FPGA, or a combination of hardware and software (e.g., software running on a processor).

It will be apparent that aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each independent claim listed below may directly depend on only one other claim, the disclosure of the invention includes each dependent claim in combination with every other claim in the claim set.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by a network device, the method comprising:
   receiving, by the network device, a request for a lawful intercept (LI) session,
      the LI session being associated with a particular priority of a set of priority levels;
   determining, by the network device, whether a maximum quantity of LI sessions has been initiated by the network device;
   initiating, by the network device and when the maximum quantity of LI sessions has not been initiated, a new LI session based on the request;
   determining, by the network device and when the maximum quantity of LI sessions has been initiated, whether at least one LI session exists that is associated with a lower priority than the particular priority;
   terminating, by the network device and when the at least one LI session associated with the lower priority exists, a particular LI session associated with a lowest priority, when terminating the particular LI session, the method includes:
      selecting a set of existing LI sessions associated with the lowest priority,
      determining whether at least one LI session, in the selected set of existing LI sessions, is associated with an invalid target, and
      selecting, when at least one LI session is associated with the invalid target, the at least one LI session associated with an invalid target as the particular LI session to terminate;
   initiating, by the network device, the new LI session based on the received request and based on terminating the particular LI session associated with the lowest priority; and
   dropping, by the network device and when the at least one LI session associated with the lower priority does not exist, the received request without initiating the new LI session.

2. The method of claim 1, further comprising:
   informing a law enforcement agency associated with the terminated particular LI session that the particular LI session has been terminated.

3. The method of claim 1, where the set of priority levels includes a low priority level and a high priority level.

4. The method of claim 1, where the set of priority levels includes a low priority level, a medium priority level, and a high priority level.

5. The method of claim 1, where, when terminating the particular LI session, the method further includes:
   determining, when the at least one LI session is not associated with the invalid target, whether at least one LI session, in the selected set of existing LI sessions, is in an idle state; and
   selecting, when at least one LI session is in the idle state, an LI session, from the selected set of existing LI sessions, associated with a longest idle time as the particular LI session to terminate.

6. The method of claim 5, further comprising:
   selecting, when at least one LI session is not in the idle state, an LI session, from the selected set of existing LI sessions, associated with an oldest initiation timestamp as the particular LI session to terminate.

7. The method of claim 1, where the network device includes a packet data network gateway of a Long Term Evolution access network.

8. A network device comprising:
   a memory to store lawful intercept (LI) session records associated with existing LI sessions of the network device; and
   a processor to:
      monitor packets based on the stored LI session records;
      receive a request for an LI session,
         the LI session being associated with a particular priority of a set of priority levels;
      determine whether a maximum quantity of LI sessions, of the stored LI session records, has been initiated by the network device;
      initiate, when the maximum quantity of LI sessions has not been initiated, a new LI session based on the request;
      determine, when the maximum quantity of LI sessions has been initiated, whether at least one LI session exists, in the stored LI session records, that is associated with a lower priority than the particular priority;
      terminate, when the at least one LI session associated with the lower priority exists, a particular LI session, in the stored LI session records, associated with a lowest priority, the processor, when terminating the particular LI session, is further to:

select a set of existing LI sessions, from the stored LI session records, associated with the lowest priority,
determine whether at least one LI session, in the selected set of existing LI sessions, is in an idle state, and
select, when at least one LI session is in the idle state, an LI session associated with a longest idle time as the particular LI session to terminate;
initiate the new LI session based on the received request and based on terminating the particular LI session associated with the lower priority; and
drop, when the at least one LI session associated with the lower priority does not exist, the received request without initiating the new LI session.

9. The network device of claim 8, where the processor is further to:
determine whether at least one LI session, in the selected set of existing LI sessions, is associated with an invalid target,
the processor, when determining whether at least one LI session, in the selected set of existing LI sessions, is in the idle state, is further to:
determine whether at least one LI session, in the selected set of existing LI sessions, is in the idle state based on determining that the at least one LI session is not associated with the invalid target.

10. The network device of claim 8, where the processor is further to:
select, when at least one LI session is not in the idle state, an LI session associated with an oldest initiation timestamp, from the selected set of existing LI sessions, as the particular LI session to terminate.

11. The network device of claim 8, where the network device includes a packet data network gateway of a Long Term Evolution access network.

12. The network device of claim 8, where the network device includes at least one of a Mobility Management Entity, a Serving Gateway, or a Policy and Charging Rules Function of a Long Term Evolution access network.

13. The network device of claim 8, where the network device includes a General Packet Radio Service node.

14. The network device of claim 8, where the network device includes a Call Session Control Function of an Internet Protocol Multi-media Subsystem.

15. The network device of claim 8, where the processor is further to:
transmit, when the particular LI session has been terminated, a notification that the particular LI session has been terminated.

16. A non-transitory computer-readable medium storing instructions, the instructions comprising:
one or more instructions, executable by a processor of a network device, to cause the processor to:
receive a request for a lawful intercept (LI) session, the LI session being associated with a particular priority of a set of priority levels;
determine whether a maximum quantity of LI sessions has been initiated by the network device;
initiate, when the maximum quantity of LI sessions has not been initiated, a new LI session based on the request;
determine, when the maximum quantity of LI sessions has been initiated, whether at least one LI session exists that is associated with a lower priority than the particular priority;
terminate, when the at least one LI session associated with the lower priority exists, a particular LI session associated with a lowest priority, the one or more instructions to terminate the particular LI session including:
one or more instructions to select a set of existing LI sessions associated with the lowest priority,
one or more instructions to determine whether at least one LI session, in the selected set of existing LI sessions, is associated with an invalid target, and
one or more instructions to select, when at least one LI session is associated with the invalid target, the at least one LI session associated with an invalid target as the particular LI session to terminate;
initiate the new LI session based on the received request and based on terminating the particular LI session associated with the lower priority; and
drop, when the at least one LI session associated with the lower priority does not exist, the received request without initiating the new LI session.

17. The non-transitory computer-readable medium of claim 16, where the one or more instructions to terminate the particular LI session include:
one or more instructions to determine, when the at least one LI session is not associated with the invalid target, whether at least one LI session, in the selected set of existing LI sessions, is in an idle state; and
one or more instructions to select, when at least one LI session is in the idle state, an LI session, from the selected set of existing LI sessions, associated with a longest idle time as the particular LI session to terminate.

18. The non-transitory computer-readable medium of claim 17, where the instructions further comprise:
one or more instructions to select, when at least one LI session is not in the idle state, an LI session, from the selected set of existing LI sessions, associated with an oldest initiation timestamp as the particular LI session to terminate.

19. The non-transitory computer-readable medium of claim 16, where the instructions further comprise:
one or more instructions to transmit, when the particular LI session has been terminated, a notification that the particular LI session has been terminated.

20. The non-transitory computer-readable medium of claim 16, where the set of priority levels includes:
a first priority level,
a second priority level,
the second priority level being different than the first priority level, and a third priority level,
the third priority level being different than the first priority level and being different than the second priority level.

* * * * *